United States Patent [19]

Saitoh

[11] Patent Number: 4,747,902

[45] Date of Patent: May 31, 1988

[54] METHOD FOR PRODUCING LAMINATED MATERIAL

[75] Inventor: Hachiro Saitoh, Yokosuka, Japan

[73] Assignee: Nippon Petrochemicals Company, Limited, Tokyo, Japan

[21] Appl. No.: 908,374

[22] Filed: Sep. 17, 1986

[30] Foreign Application Priority Data

Sep. 24, 1985 [JP] Japan ................................. 60-210435

[51] Int. Cl.$^4$ .............................................. B32B 31/30
[52] U.S. Cl. .......................... 156/244.11; 156/244.23; 156/244.27
[58] Field of Search ..................... 156/244.11, 244.23, 156/244.27

[56] References Cited

U.S. PATENT DOCUMENTS

| | | | |
|---|---|---|---|
| 3,340,123 | 9/1967 | Osmon | 156/244.23 |
| 3,629,037 | 12/1971 | Masuda | 156/244.11 |
| 3,698,934 | 10/1972 | Eichhorn et al. | 156/244.11 |
| 4,242,395 | 12/1980 | Zuckerman et al. | 156/244.11 |
| 4,370,187 | 1/1983 | Katagiri et al. | 156/244.27 |
| 4,476,080 | 10/1984 | Komoda et al. | 156/244.11 |

*Primary Examiner*—David Simmons
*Attorney, Agent, or Firm*—Scully, Scott, Murphy & Presser

[57] ABSTRACT

A method for producing a laminated material giving higher adhesive strength of laminated layers and the thermal deterioration of polyolefin and the undesirable release of the active agent during the lamination process are avoided. The method is characterized in that the substrate sheet is previously laminated with a polyolefin layer, and a molten web of polyolefin film is laminated to the side of said polyolefin layer of the substrate sheet under pressure at a relatively lower temperature.

15 Claims, No Drawings

METHOD FOR PRODUCING LAMINATED MATERIAL

BACKGROUND OF THE INVENTION

(1) Field of the Invention

This invention relates to a method for producing laminated material. More particularly, the invention relates to a method for producing laminated material which is characterized in that the lamination process can be carried out quite easily, the adhesive strength between laminated layers is high and, in the lamination process, the thermal deterioration of polyolefin or its composition or the undesirable release or deterioration of active agents in the polyolefin composition are well avoided.

(2) Description of the Prior Art

As a typical method for producing laminated materials, there is known an extrusion laminating method.

In this method, several kinds of substrate materials of papers such as quality paper or kraft paper, plastic films, regenerated cellulose film and metal foils are coated by molten polyethylene by extrusion lamination, thereby producing various kinds of wrapping or packaging materials and so forth utilizing the advantageous properties of the combination of a substrate material and a plastic material such as water-proofness, moisture-proofness, chemical resistance, softness, heat-sealable property, etc.

The adhesive bonding mechanisms in the above lamination process are classified into two kinds, i.e., mechanical adhesive bonding and chemical adhesive bonding. The former mechanical adhesive bonding is applied to porous substrate materials such as cloth and paper, in which the molten polymer extruded at high a temperature infiltrates into fine pores among fibers and it is then solidified by cooling providing adhesive bonding between a plastic material and a substrate material.

The latter chemical adhesive bonding utilizes the chemical intermolecular force and it is applied to the materials having smooth surfaces such as regenerated cellulose film, aluminum foil and plastic films or those having no functional groups. In order to obtain satisfactory bonding force in the chemical adhesive bonding, it is necessary that the substrate material is subjected to primer treatment, and it is often treated by corona discharge.

Meanwhile, it is also desirable that the polyethylene used for extrusion coating is activated. As the method for this activation, it is a general practice that polyethylene is extruded at higher temperatures so as to increase oxygen-containing polar groups (carbonyl groups) in molecules before it is brought into contact with a substrate material so as to provide sufficient adhesive strength.

In the former mechanical adhesive bonding, when the temperature of molten polymer is high, the viscosity of polymer is lowered to improve the infiltration into a substrate material and the adhesive strength is also improved. Therefore, the lamination is done at possibly high temperatures as far as the polymer is not decomposed. Accordingly, low density polyethylene is generally melted and kneaded by being heated to, at the lowest, 280° to 310° C. in the conventional lamination process. In this process, it is necessary that the polyethylene is not decomposed and does not give out any offensive odor. In the industrial practice, however, partial decomposition is caused to occur with giving off irritating smell from decomposed product, and much smoke is emitted during the processing. Thus the polyethylene suffers from serious thermal deterioration.

Meanwhile, in the case that polyolefin laminated with substrate sheet contains a drug or other agent such as insecticides and other biologically active agents, perfumes and deodorants (hereinafter referred to as "active agents"), the active agents are diffused in the polyolefin layer to reach boundary surfaces of layer, and with the passage of time, the layer sometimes peels off from the substrate sheet.

In a first method for producing a laminated material, two steps of the preparation of films to be laminated and the lamination of the prepared films are done separately. In the other second method, the polyolefin containing the active agents is laminated with a sheet material by extrusion lamination in one step process. This method is, however, defective because the thermal deterioration and undesirable release of active agents are caused to occur due to the high temperature in the extrusion lamination and, in a worse case, the thermal decomposition or thermal degradation of active agents occurs, besides the peeling of layers.

In the conventional methods, there are problems of the thermal deterioration of polyolefin and undesirable release or thermal degeneration of active agents. Even though it is intended to solve these problems by carrying out the extrusion lamination at low temperatures, it has not been successful because the adhesive strength between adjoining layers becomes very low.

BRIEF SUMMARY OF THE INVENTION

It is, therefore, the primary object of the present invention to provide an improved method for producing a laminated material which method is free from the above-described disadvantages in the conventional art.

Another object of the present invention is to provide a method for producing an excellent laminated material of a substrate layer and a film of polyolefin or polyolefin composition (hereinafter simply referred to as "polyolefin") or a polyolefin composition containing active agents, which method is carried out under specific conditions.

A further object of the present invention is to provide a method for producing a laminated material in which the thermal deterioration of polyolefin is avoided and, when active agents are used, the undesirable release of the active agents by evaporation during lamination is reduced, and the adhesive strength between component layers (hereinafter referred to as "interlayer adhesive strength") is much improved.

In accordance with the method of the present invention, the substrate sheet is a sheet material which is previously applied with the lamination of polyolefin. In a first method of the invention, a polyolefin film or active agent-containing polyolefin film to be laminated is used by being heated to a molten web. In the other second method, the step of preparation of the film to be laminated and the step of lamination are combined into one step. Thus, the extruded molten web of polyolefin or active agent-containing polyolefin is directly laminated to the substrate material. In these processes, the temperature of the molten web is set as low as possible in order to avoid the thermal deterioration of the polyolefin and the undesirable release of the contained active agents. That is, the temperature of the molten web is in the range between the melting point or softening point of the polymer to be laminated and a temperature higher than said temperature by 100° C. The molten web of polyolefin or active agent-containing polyolefin is heated to the above temperature range and it is put in layers on the side of the polyolefin of the substrate sheet that is previously laminated with polyolefin, and then they are pressed together.

DETAILED DESCRIPTION OF THE INVENTION

The polyolefins used in the method of the present invention are low density, medium density and high density ethylene homopolymers; copolymers of ethylene as the main component with α-olefins such as ethylene-propylene copolymer, ethylene-butene-1 copolymer, ethylene-hexene-1 copolymer, ethylene-4-methylpentene-1 copolymer, ethylene-octene-1 copolymer; carboxyl group-containing ethylene copolymers such as ethylene with vinyl acetate and ethylene with acrylic ester; propylene homopolymer; copolymers of propylene as the main component with other α-olefins; butene-1 homopolymer; poly-4-methylpentene-1; modified polyolefins prepared by reacting the above polyolefins with unsaturated carboxylic acids such as maleic acid, its anhydride or their derivatives; and the mixtures of the above resins.

For example, when the polyolefin to be laminated to a substrate sheet is polyethylene (PE), it is desirable that the material for the molten web is PE or ethylenevinyl acetate copolymer (EVA). In the case that the polyolefin is polypropylene (PP), it is desirable that the material for the molten web is PP or EVA and when EVA is used as the polyolefin, EVA or PE is desirable as the material for the molten web.

The foregoing temperature range of molten web, that is the temperatures from the melting point or the softening point of the film to be laminated to the temperature higher than said temperature by 100° C., depend upon the kind of used polyolefin. For example, the temperatures are as follow:

PE 100° C.—200° C.
PP 150° C.—250° C.
EVA 80° C.—180° C.

When the temperature of the molten web is lower than the above temperature range, the molten web cannot be bonded well resulting in low interlayer adhesive strength. On the other hand, when the temperature of the molten web is higher than the above temperature range, high interlayer adhesive strength cannot be expected owing to the thermal deterioration of the polyolefin, furthermore, offensive odor and smoke are much produced and, when active agents are mixed, the agents are readily evaporated, and what is worse, the thermal decomposition or deterioration is undesirably brought about.

The most preferable mode of the method of the present invention is the use of the composition consisting of the foregoing carboxyl group-containing ethylene copolymer and low density polyethylene as the polyolefin molten web material.

That is, when only a carboxyl group-containing ethylene copolymer such as ethylene-vinyl acetate copolymer (EVA) or ethylene ethyl acrylate copolymer (EEA) is used, even though the performance depends upon the content of carboxyl group, a desirable molten web cannot be obtained sometimes, especially in high speed film formation, due to the breakdown of film or other troubles. In such the case, it is possible to avoid the problems by adding low density polyethylene to EVA or EEA. The melt index (MI) of the low density polyethylene used for this purpose is preferably not less than 30 g/10 min. and more preferably in the range of 30 to 200 g/10 min.

By using the above composition as the polyolefin film, it is possible to carry out high speed lamination without any film breakage and, even when the extrusion lamination is done at a relatively low temperature, the lamination with highly improved interlayer adhesive strength can be attained.

Even though the strict reason why the interlayer adhesive strength can be improved has not been clear, the fact which has been found out by the inventor of the present invention is that, in order to facilitate the low temperature lamination and the bonding of molten web, the substrate sheet to receive the molten web must be previously applied with polyolefin.

The above-described polyolefin film to be laminated may be of a single material, however, several kinds of active agents can be incorporated, in which one of the advantages according to the present invention that the evaporation or release of the active agents is less, can be attained. As the active agents, volatile ones are desirable. For example, there are perfumes, deodorants, antifungal agents, germicides, insect repellents, insecticides, rodenticides, rust inhibitors, antiseptic agents and antifouling agents.

Perfumes are divided into two groups of natural perfumes and artificial perfumes. The natural perfumes are exemplified by animal perfumes of musk, civet, castreum and amber gris and vegetable perfumes consisting of essential oils such as lavender oil, peppermint oil, lemon oil, orange oil, rose oil, camphor oil, sandalwood oil, and hinoki oil.

The artificial perfumes are exemplified by synthetic perfumes such as terpene compounds and aromatic compounds, isolated perfumes derived by fractional distillation from essential oils, and other various isolated perfumes, and formulated perfumes prepared by mixing synthetic perfumes and natural perfumes in view of practical applications. At least one of them is used in the method of the present invention.

Other active agents are further exemplified by deodorants such as "Fresh Shiraimatsu" (trademark, made by Shiraimatsu Shin'yaku Co., Ltd.), "Biodash" (trademark, made by Osaka Soda Co., Ltd.; Tokyo Seikagaku Kenkyusho Co., Ltd.), "Anico" (trademark, made by Minato Sangyo Co., Ltd.); antifungal agents such as thiabendazole, vinazine and α-brome cinnam aldehyde; germicides such as alcohols, formalin, salicylic acid, creosote, phenol, nitrofurazone, and nitrofurylacrylic acid amide; natural pyrethrin, pyrethroid insect repellents of synthetic pyrethrin-like compounds such as "Pinamine", "Permethorine", "Vaporthrin" (all trademarks, made by Sumitomo Chemical Co., Ltd.); insecticides such as DDT, BHC, drine-agents, parathion, DDVP, and PGP; rodenticides such as "Naramycin" (trademark, made by Tanabe Seiyaku Co., Ltd.), "Ramtarine" (trademark, made by Matsushita Electric Works Co., Ltd., "Kotomycin" (trademark, made by Osaka Kasei Co., Ltd.); repellents for dogs and cats such as lemonglass oil and tar of tobacco; volatile rust inhibitors of organic amine salts such as cyclohexylammonium nitrite and heterocyclic amines such as benzotriazole and methylbenzotriazole; antiseptic agents for foodstuffs such as sorbic acid and dehydroacetic acid; and antifouling agents such as phenylmercuric acetate, phenylmercuric oleate, copper naphthenate and copper oleate. These active agents may not always be volatile ones and they can be used singly or in combination of two or more kinds in accordance with the purpose of use.

The substrate sheet used in the method of the present invention are synthetic resin films made of the above-mentioned polyolefins, polyamides, polyesters, polyvinylidene chloride, polyvinyl chloride, polystyrene, polyacrylate, and regenerated cellulose; metallized films; paper; cloth; nonwoven fabric; and metal foil. These substrate sheets can be used singly or in combination of two or more kinds.

The serviceable life time and the effective level of active agents can be controlled by making a multi-layer laminate, for example, by combining a permeable substrate sheet such as paper, cloth or nonwoven fabric and/or impermeable film made of a saponified ethylene-vinyl acetate copolymer, polyamide, polyester, polyvinylidene chloride or aluminum foil with a film of polyolefin containing active agents.

In the following, examples of the product made in accordance with the method of the present invention will be given. It is, however, to be noted that the present invention is by no means restricted to these examples.

1. A laminated material (b/a/b') made of a film (a) of a polyolefin composition containing a perfume as an active agent and permeable sheet materials (b, b') applied on both sides of the film (a), can be used for fragrant books, bookmarkers, pamphlets, tickets, name cards, post cards, telegram paper, fans, and cores of rolled paper.

2. When an adhesive (d) is applied to one side face of the above laminated material to obtain another laminated material (b/a/b'/d), it can be used for fragrant labels and posters.

3. When a laminated material (b/a/c) is made of a film (a) of a polyolefin composition containing active agents, a permeable sheet material (b) applied on one side of the film (a) and an impermeable sheet material (c) on the other side of the film (a) and if the active agent is a fragrant substance, the laminated material can be used for fragrant calendars, posters, decorated building materials such as wall and ceiling materials, and perfume sample books.

4. When an adhesive (d) is applied to one side face of the above laminated material to obtain a laminated material (b/a/c/d), it can be used for fragrant labels and posters.

5. When an impermeable sheet materials (c, c') are laminated on both sides of an active agent-containing polyolefin composition film (a) to obtain a laminated material (c/a/c') and it is slit into fine threads, the fragrance is released gradually from the cross-section of the threads. These can be used, for example, as fragrant lamé material.

6. When an impermeable sheet material (c) is laminated on only one side of an active agent-containing polyolefin composition film (a) to obtain a laminated material (c/a) and it is used as a wrapping material, the laminated material can give odor to wrapped goods. Thus, it can be used as wrapping materials for lavatory tissue, greeting cards, and letter paper. Furthermore, it is also possible to use the laminated material as sealing paper for carton boxes of lavatory paper and casings of foodstuffs and flowers, with which fragrance can be enjoyed when they are opened.

7. Applications besides the above perfumes are as follows: Deodorant posters, deodorant sheets, deodorant garbage bags, and deodorant waste bags; antifungal bags for clothing and leather goods; antiseptic packaging materials for foodstuffs; mosquito repellent labels; mosquito repellent fans; insecticide sheets; wrapping sheets for growing fruits; rodenticide packaging materials; garbage bags and labels repellent to animals such as cats and pigeons; and rust inhibitive packaging materials for steel pipes and machinery.

As described above, the laminated material produced according to the method of the present invention has excellent interlayer adhesive strength and laminated layers are not peeled off after the passage of a certain time because the substrate sheet is previously applied with a polyolefin layer by extrusion lamination and other polyolefin layer is then laminated to the side of the previously applied polyolefin layer.

Furthermore, because the molten web of polyolefin or active agent-containing polyolefin composition is laminated at relatively low temperature, the release of active agents by evaporation and the thermal deterioration of polyolefin hardly occur during lamination.

Still further, in place of the conventional film formation of polyolefin or active agent-containing polyolefin composition and the lamination of the film with a substrate material, the lamination process can be rationarized into one step by laminating the polyolefin film or active agent-containing polyolefin composition film as an extruded molten web.

The present invention will be further described with reference to several examples.

EXAMPLE

A substrate sheet was prepared by conventional extrusion lamination at 300° C., in which 20 micron thick layer of low density polyethylene (density: 0.925, MI: 5) was applied to the surface of quality paper of 49 g/m$^2$ in basis weight. After that, a 50 micron thick web of low density polyethylene (density: 0.920, MI: 8) was extruded at 170° C. and it was laminated under pressure to the side of the low density polyethylene of the substrate sheet to obtain a laminated material of the present invention.

Meanwhile, a laminated material of comparative example was prepared by extrusion lamination at 170° C., in which 50 micron thick layer of low density polyethylene (density: 0.920, MI: 8) was applied to the surface of quality paper of 49 g/m$^2$ in basis weight.

The interlayer adhesion strengths of these laminated materials were as follows:

Present Invention: 815 g/15 mm. width
Comparative Exam.: 167 g/15 mm. width

In the like manner as the above, laminated materials were prepared using another polyolefin and the interlayer adhesive strength was tested.

That is, a substrate sheet was prepared by extrusion lamination at 270° C., in which 20 micron thick layer of ethylene-vinyl acetate copolymer (density: 0.930, MI: 5, vinyl acetate content: 35%) was applied to the surface of quality paper of 49 g/m$^2$ in basis weight. After that, a 50 micron thick web of polypropylene (MFI: 4) was extruded at 220° C. and it was laminated under pressure to the side of the ethylene-vinyl acetate copolymer of the substrate sheet to obtain a laminated material of the present invention.

Meanwhile, a laminated material of comparative example was prepared by extrusion lamination at 220° C., in which 50 micron thick layer of polypropylene (MFI: 4) was applied to the surface of quality paper of 49 g/m² in basis weight.

The interlayer adhesion strengths of these laminated materials were as follows:
  Present Invention: 362 g/15 mm. width
  Comparative Exam.: 83 g/15 mm. width A substrate sheet was prepared by conventional extrusion lamination at 300° C., in which 20 micron thick layer of low density polyethylene (density: 0.925, MI: 5) was formed on the surface of quality paper of 49 g/m² in basis weight. After that, a 50 micron thick web of a composition of 25 wt % of EVA (density: 0.953 g/cm³, MI: 30 g/10 min.) containing 20% of lemon flavor and 75 wt % of low density polyethylene (density: 0.919, MI: 40 g/10 min.) was extruded at 170° C. and it was laminated under pressure to the side of the polyethylene of the substrate sheet to obtain a laminated material of the present invention.

Meanwhile, a laminated material of comparative example was prepared by extrusion lamination at 300° C., in which 50 micron thick layer of low density polyethylene (density: 0.920, MI: 8) containing 5% lemon flavor was formed on the surface of quality paper of 49 g/m² in basis weight.

These laminated materials were compared with each other, the results of which were as follows:

Present Invention

Interlayer adhesive strength: 723 g/15 mm. width
(No change was observed after one month)
Fragrance: It smelled of the odor just like before the mixing. The odor did not change after one month Comparative Example Interlayer adhesive strength: 736 g/15 mm. width
(After one month, this value changed to 235 g/15 mm. width)
Fragrance: It smelled of a different and weak odor as compared with the odor before the mixing. After one month, the odor could hardly be sensed.

As described above, in the method of the present invention, an extruded molten web of polyolefin or a composition of polyolefin containing active agents is laminated in one step process to provide the simplification of lamination process. The interlayer adhesive strength is high and the laminated layer does not peel off after the passage of time. Furthermore, the thermal deterioration of polyolefin hardly occurs and, when a polyolefin composition containing active agents is laminated, the quantity of undesirable release of the active agents by evaporation is quite small.

What is claimed is:

1. A method for producing a substrate sheet-polyolefin film laminate comprising laminating a molten web of a composition of (a) low density polyethylene characterized by a melt index of at least 30 g/10 min and (b) a carboxyl group-containing ethylene copolymer, said copolymer containing at least one active agent, to a substrate sheet, said sheet previously laminated with a polyolefin layer, said molten web laminated to the polyolefin surface of said subtrate sheet under pressure at a temperature in the range of between the melting or softening point of said low density polyethylene and a temperature 100° C. higher than said melting or softening point of said low density polyethylene.

2. The method of claim 1 wherein said carboxyl group-containing ethylene copolymer is selected from the group consisting of an ethylene-vinyl acetate copolymer and an ethylene-acrylic ester copolymer.

3. The method of claim 1 wherein said material of said substrate sheet is selected from the group consisting of synthetic resin films, paper, cloth, nonwoven fabric, metal foils and combinations thereof.

4. The method of claim 1 wherein said substrate sheet is a multi-layered structure.

5. The method of claim 1 wherein said multi-layered substrate sheet structure includes a member selected from the group consisting of a permeable film, an impermeable film and mixtures thereof.

6. The method of claim 1 wherein said active adjacent is volatile.

7. The method of claim 1 wherein said active agent is a perfume.

8. The method of claim 1 wherein said active agent is a deodorant.

9. The method of claim 1 wherein said active agent is an antifungal agent.

10. The method of claim 1 wherein said active agent is a germicide.

11. The method of claim 1 wherein said active agent is an insect repellent.

12. The method of claim 1 wherein said active agent is an insecticide.

13. The method of claim 1 wherein said active agent is a rodenticide.

14. The method of claim 1 wherein said active agent is an animal repellent.

15. The method of claim 1 wherein said active agent is a rust inhibitor.

* * * * *

UNITED STATES PATENT AND TRADEMARK OFFICE
CERTIFICATE OF CORRECTION

PATENT NO. : 4,747,902

DATED : May 31, 1988

INVENTOR(S) : Hachiro Saitch

It is certified that error appears in the above-identified patent and that said Letters Patent is hereby corrected as shown below:

Column 8, line 31, Claim 6: "adjacent" should read as --agent--

Signed and Sealed this

Twenty-fourth Day of January, 1989

*Attest:*

DONALD J. QUIGG

*Attesting Officer*  *Commissioner of Patents and Trademarks*